United States Patent [19]

Masuko et al.

[11] Patent Number: 5,674,953

[45] Date of Patent: Oct. 7, 1997

[54] METHOD OF PREVENTING SCALE ADHESION TO SURFACES OF POLYMERIZATION TANK WITH PHENOL-ALDEHYDE COATING

[75] Inventors: Seiichi Masuko; Ichisaburo Nakamura; Keiichi Fukuda; Yasuyuki Hatakeyama, all of Osaka; Akihiro Yamaguchi, Kanagawa; Keizaburo Yamaguchi, Chiba, all of Japan

[73] Assignee: Mitsui Toatsu Chemicals, Inc., Tokyo, Japan

[21] Appl. No.: 466,522

[22] Filed: Jun. 6, 1995

Related U.S. Application Data

[62] Division of Ser. No. 53,974, Apr. 9, 1993, which is a continuation of Ser. No. 743,356, Aug. 20, 1991, abandoned.

[30] Foreign Application Priority Data

| Dec. 28, 1989 | [JP] | Japan | 1-338205 |
| Jul. 11, 1990 | [JP] | Japan | 2-181538 |
| Aug. 28, 1990 | [JP] | Japan | 2-225188 |
| Aug. 31, 1990 | [JP] | Japan | 2-227952 |
| Oct. 31, 1990 | [JP] | Japan | 2-291870 |
| Nov. 28, 1990 | [JP] | Japan | 2-323139 |

[51] Int. Cl.$^6$ .................... C08F 2/20; C08F 2/02
[52] U.S. Cl. .................... 526/62; 526/344; 528/148
[58] Field of Search .................... 526/62; 528/148, 528/153

[56] References Cited

U.S. PATENT DOCUMENTS

| 3,316,140 | 4/1967 | Sonnabend | 528/153 |
| 4,200,712 | 4/1980 | Cohen | 526/62 |
| 4,320,215 | 3/1982 | Yonezawa et al. | 526/62 |
| 4,355,141 | 10/1982 | Okada et al. | 526/62 |
| 4,431,783 | 2/1984 | Walker et al. | 526/62 |
| 4,555,555 | 11/1985 | Toyooka et al. | 526/62 |
| 4,579,758 | 4/1986 | Dorsch et al. | 526/62 |

FOREIGN PATENT DOCUMENTS

| 54-107991 | 8/1979 | Japan. |
| 55-160004 | 12/1980 | Japan. |
| 57-502169 | 12/1982 | Japan. |
| 58-180511 | 10/1983 | Japan. |
| 61-181802 | 8/1986 | Japan. |

*Primary Examiner*—Christopher Henderson
*Attorney, Agent, or Firm*—Burns, Doane, Swecker & Mathis

[57] ABSTRACT

In a novel method of homo- or copolymerization of vinyl chloride, a specified coating agent is applied on the surfaces of the portions which will become into contact with the vinyl chloride monomer during the polymerization process. The coating agent is in a form of an aqueous solution of a modified condensation product of phenol and aldehyde, the pH of the solution being adjusted in a range that the product is dissolved at an ambient temperature upon coating of the solution and separates out of the solution upon being heated on the surfaces. The wall surface of the polymerization tank and the like is then coated with a thin film of the coating agent having a uniform thickness and being strongly adhered to the wall surface, thereby providing an excellent effect of preventing adhesion of the product polymer to the wall surface.

2 Claims, 1 Drawing Sheet

METHOD OF PREVENTING SCALE ADHESION TO SURFACES OF POLYMERIZATION TANK WITH PHENOL-ALDEHYDE COATING

This application is a divisional of application Ser. No. 08/053,974, filed Apr. 9, 1993, which is a continuation of application Ser. No. 07/743,356 filed on Aug. 20, 1991, now abandoned.

BACKGROUND OF THE INVENTION

1. Field of the Invention

The present invention relates to an improved method of monopolymerizing or copolymerizing vinyl chloride, and more particularly a method of preventing the polymer from adhering to the inner wall surface of a polymerization tank and the like at the time of polymerization. Further, the present invention also relates to a coating agent for preventing a polymer from adhering to the inner wall surface of a polymerization tank and the like and to a method of producing said coating agent.

2. Prior Art

Vinyl chloride is polymerized alone or copolymerized (hereinafter simply referred to as "polymerized") with a monomer copolymerizable with it. However, the polymer adheres to apparatus parts that are in contact with the monomer(s) during the polymerization such as a polymerization tank inner wall, reflux condenser, stirring blades, baffles, and various attached pipeline connecting parts, there arise such problems that the cooling capability of the polymerization tank decreases or the polymer adheres to the apparatus parts and then breaks off to go into the homopolymer or copolymer (hereinafter referred to as "product") of vinyl chloride thereby lowering the quality of the product. Therefore, customarily, every time after the completion of polymerization, the inside of the polymerization tank is cleaned and then polymerization is effected, but to do so needs much labor and time, which leads to the reduction of the operating efficiency of the polymerization tank and the increase of the production costs.

Accordingly, hitherto, techniques have been suggested wherein an agent is applied to the inner wall of a polymerization tank and other parts to prevent a polymer from adhering thereto.

However, although these techniques are effective for preventing a polymer from adhering, they are accompanied by such defects that the polymerization rate is lowered and physical properties of the product are deteriorated and therefore they are not satisfactory to be used industrially. Further, although techniques that do not influence adversely the polymerization rate and physical properties of the product are suggested, the techniques are not so much effective for preventing a polymer from adhering. For example, although techniques wherein a co-condensate of resorcin and an aldehyde is applied (JP-A ("JP-A" means unexamined published Japanese patent application) Nos. 502169/1982 and 502170/1982) are suggested, the effect for preventing a polymer from adhering is still not adequate.

OBJECTS OF THE INVENTION

A principal object of the present invention is to provide a method of preventing effectively a polymer from adhering to the inner wall surface of a polymerization tank and the like at the time of homopolymerization or copolymerization of vinyl chloride.

Another object of the present invention is to provide a coating agent for preventing a polymer from adhering to the inner wall surface of a polymerization tank and the like.

Still another object of the present invention is to provide a method of producing a coating agent for preventing adhesion.

SUMMARY OF THE INVENTION

In one mode of the present invention, a coating agent to be applied to a polymerization tank inner wall and apparatus parts that will be in contact with a monomer(s) during the polymerization comprises an aqueous solution adjusted to a pH at which a specific condensation product that dissolves at a certain pH value, i.e., at temperatures at the time of the application deposits, when the aqueous solution is heated, on the polymerization tank inner wall and the like. When such a coating agent is used, the polymerization tank inner wall and the like are covered with a thin film uniformly and firmly and an excellent effect of preventing a polymer from adhering can be obtained.

In another embodiment of the present invention, a coating agent is provided that has an effect of preventing a polymer from adhering to a polymerization tank inner wall and the like. A typical example of the coating agent is a solution containing a modified condensate of a phenol and an aldehyde.

In a preferable embodiment of the present invention, a method of polymerizing vinyl chloride according to the present invention comprises applying a reaction product having a molecular weight of 500 to 100,000 to a polymerization tank inner wall and apparatus parts that will be in contact with the monomer(s) during the polymerization at the time when the vinyl chloride is polymerized in an aqueous medium or is subjected to mass polymerization, which reaction product is previously obtained by condensing a dihydroxybiphenyl and an aldehyde in the presence of an acid catalyst.

In another embodiment of the present invention, a coating agent to be applied to a polymerization tank inner wall and apparatus parts that will be in contact with a monomer(s) during the polymerization is a co-condensate obtained by reacting an initial condensate of a phenol and an aldehyde with compounds including at least a hindered phenol.

In still another embodiment of the present invention, a coating agent to be applied to a polymerization tank inner wall and apparatus parts that will be in contact with a monomer(s) during the polymerization is an aqueous alkali solution containing a co-condensate with phenolic hydroxyl groups, the pH at which the co-condensate deposits from the solution being 8.0 or over and the water-solubility of the co-condensate being 35% or below.

Preferably, said co-condensate is one having a weight-average molecular weight of 500 to 10,000 obtained by reacting an initial condensate of a phenol and an aldehyde with a hindered phenol and a poly-valent phenol in the presence of a strongly acidic catalyst.

According to still another embodiment of the present invention, a method of producing a coating agent for preventing vinyl chloride polymer from adhering to the inner wall surface of a polymerization tank and the like where vinyl chloride is polymerized is provided.

Further, the present invention provides a method of producing a coating agent to be applied to a polymerization tank inner wall and apparatus parts that will be in contact with a monomer(s) during the polymerization. That is, the method comprises a step of producing an initial condensate of a phenol and an aldehyde, a step of producing a modified phenolic resin by reacting the obtained initial condensate with a hindered phenol, a nitrogen-containing compound, or a poly-valent phenol, a step of diluting the reaction product liquid containing the modified phenolic resin with water, a step of adjusting the pH of the diluted liquid to deposit the modified phenolic resin, and a step of dissolving the deposited modified phenolic resin in an organic solvent or an aqueous alkali solution.

DETAILED DESCRIPTION OF THE INVENTION

In one mode of the present invention, a coating agent to be applied to the inner wall surface of a polymerization tank and the like is adjusted to a pH at which said reaction product that dissolves at a certain pH value, i.e., at temperatures at the time of the application deposits when being heated on the polymerization tank inner wall and the like. The most preferable coating agent is one obtained by modifying a resol type initial condensate, which is produced by reacting a phenol and an aldehyde under alkaline conditions, with various modifiers. Examples of the phenol include monovalent phenols such as phenol, cresol, and ethylphenol, bivalent phenols such as resorcin and hydroquinone, and bisphenols such as bisphenol A and their substituted products, which may be used alone or in combination. The aldehyde includes organic compounds having a CHO-group such as formaldehyde, acetaldehyde and furfural, which may be used alone or in combination. Of these, as a phenol that is industrially inexpensive and readily available, phenol, and as the aldehydes, formaldehyde is preferably used. Examples of the modifiers may include alkylphenols and poly-valent phenols. However, the present invention includes the use of all substances other than the above substances if they have properties that when they are in the state where the pH is adjusted to a prescribed pH, they dissolve at temperatures, at which the application is carried out, and deposit the above reaction product, when heated, on a polymerization tank inner wall and the like. Preferable examples of the coating agent used in this invention include a condensation product of pyrogallol and an aldehyde and a self-condensation product of poly-valent phenols such as resorcin.

To carry out the present invention, the coating agent is dissolved in a 0.05 to 5 wt. % aqueous alkali metal or alkali earth metal hydroxide solution so that its concentration may be 0.1 to 10.0 wt. % and preferably 0.2 to 6.0 wt. %. When the concentration of the coating agent is less than 0.1 wt. %, it is not preferable because the amount of the liquid to be applied is too large, leading to a decrease in workability, and the polymer adhesion preventive effect becomes poor. On the other hand, if the concentration exceeds 10.0 wt. %, it becomes difficult to apply the coating agent on the wall surface uniformly and the coating amount increases, which is not economical, and further when the washing with water after the application is not sufficient, it affects adversely the quality of the product. As an alkali metal or alkali earth metal hydroxide, sodium hydroxide, potassium hydroxide, or calcium hydroxide is particularly preferable with sodium hydroxide more preferable, which is used in the form of an aqueous solution.

It is preferable to adjust the pH with an inorganic acid or organic acid so that the coating agent in the coating fluid, that is, the active ingredient may have a pH 0.2 to 0.4 higher, more preferably 0.3 to 3.0 higher, than the pH at which the active ingredient will deposit at normal temperatures. If the adjusted pH is less than 0.2, higher than the pH at which the active ingredient will deposit at normal temperatures it is unpreferable because sometimes the coating agent in the coating fluid deposits with time. On the other hand, if the adjusted pH is greater than 4.0, higher than the pH at which the active ingredient will deposit at normal temperatures it is unpreferable because when the wall surface is brought to a high temperature at the time of the application, some kinds of coating agents do not fall in the deposition zone and the polymer adhesion preventive effect becomes inadequate. As the acid for adjusting the pH, inorganic acids such as hydrochloric acid, sulfuric acid, phosphoric acid, and nitric acid and organic acids such as ascorbic acid, acetic acid, citric acid, and mercaptopropionic acid can be mentioned.

Figure 1:
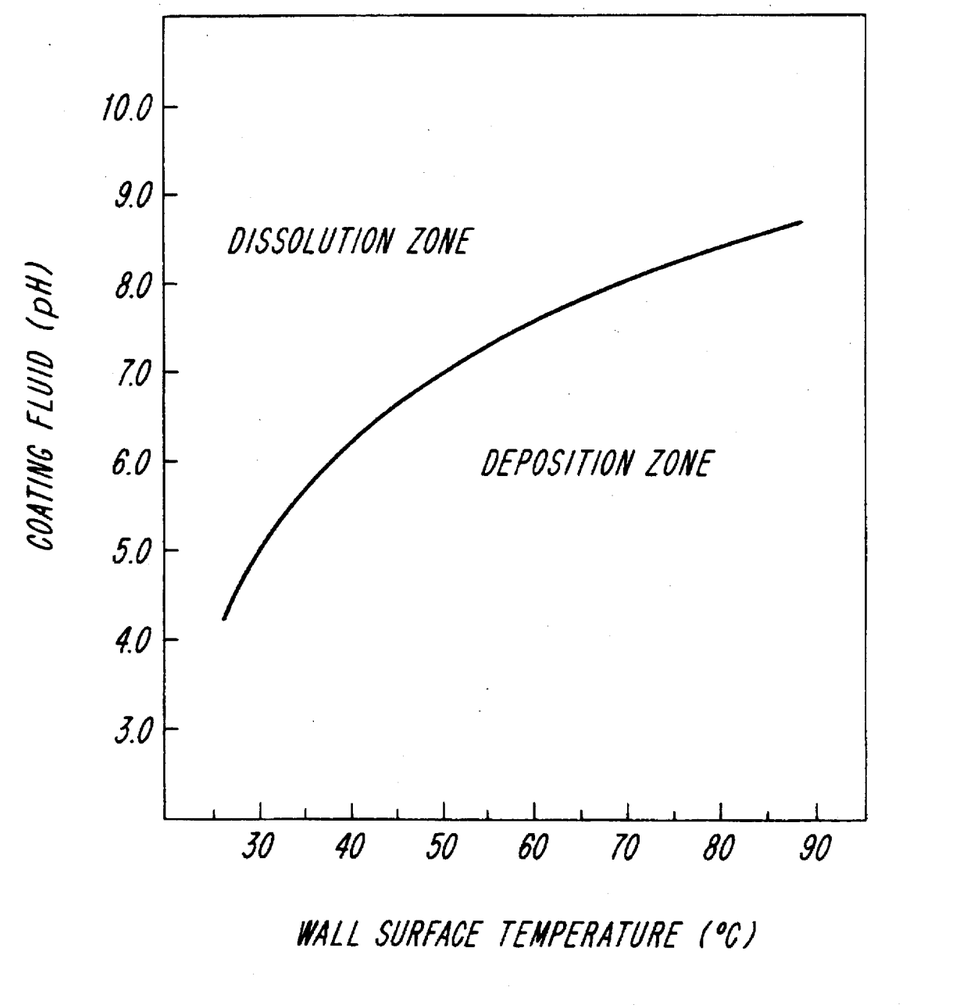
The FIGURE is a deposition curve diagram of the coating fluid used in one Example of the present invention.

When the coating fluid of the present invention is applied to a polymerization tank wall and the like, it is desirable that the wall surface to be coated with the coating fluid is heated to a temperature ranging from 40° to 100° C. When the temperature is less than 40° C., even if the coating fluid whose pH has been adjusted as specified is used, the coating agent fails to fall in the deposition zone as apparent from the deposition curve diagram in the FIGURE and the effect for preventing a polymer from adhering is poor. The application of a temperature exceeding 100° C. is not practical because it takes too much time to elevate the temperature. A more preferable wall temperature is in the range of 45° to 95° C., further more preferably 50° to 90° C. After the application, it is arbitrary to wash the coated surface with water but it is advantageous to wash the coated surface with water so as to prevent the produced polymer from being colored.

In the present method, it is required to place the coating agent on a polymerization tank wall and the like under the above conditions, and although there is no particular restriction on the way of the application, the application can be carried out in common manner, for example, by brushing, spraying, rinse of the coating fluid. It is generally enough if the coating amount is 0.005 to 10 g/m$^2$ in terms of the weight of the coating agent with 0.01 to 5 g/m$^2$ preferable. If the coating amount is less than 0.005 g/m$^2$, the coating agent becomes sparse and the polymer adhesion preventive effect is poor while if the coating amount exceeds 10 g/m$^2$, it is unpreferable because the prevention of adhesion of a polymer does not become more effective, the coating fluid will be used wastefully and uneconomically, and the quality of the product will be adversely influenced if the washing with water after application is not done well.

Before the start of the processing of each batch of the polymerization, the application of the coating fluid may be carried out, or after one application of the coating fluid, two or more batches of the polymerization can be processed after simple washing with water for each batch.

The present invention can be applied not only to homopolymerization of vinyl chloride but also effectively to copolymerization of vinyl chloride with a monomer copolymerizable or graft copoymerizable with vinyl chloride, for example, vinyl esters such as vinyl acetate, vinyl propionate, vinyl caproate, vinyl laurate, vinyl stearate; olefins such as ethylene, propylene and isobutylene; alkyl vinyl ethers such as isobutyl vinyl ether, octyl vinyl ethers, dodecyl vinyl ether and phenyl vinyl ether; halogenated olefins such as vinylidene chloride, vinyl fluoride, propylene chloride and vinyl bromide; acrylic or methacrylic esters such as ethyl acrylate, n-butyl methacrylate, 2-ethylhexyl acrylate, 2-ethylhexyl methacrylate and stealyl methacrylate; and acrylic derivatives such as acrylic acid, methacrylic acid, crotonic acid, acrylonitrile, maleic anhydride and itaconic anhydride.

Examples of the polymers graft polymerizable with vinyl chloride may include ethylene-vinyl acetate copolymer (EVA), ethylene-ethyl acrylate copolymer, chlorinated polyethylene, polyurethane, polybutadiene-styrene-methylmethacrylate (MBS), butadiene-acrylonitrile-(α-methyl) styrene (ABS), polybutylacrylate, butyl rubber, polystyrene, styrene butadiene copolymer and cross-linked acryl rubber.

Another coating agent to be used in the present method is a reaction product of a dihydroxybiphenyl and an aldehyde, which reaction product is represented by the following formula:

wherein R represents a hydrogen atom, an alkyl group having 1 to 8 carbon atoms, a cycloalkyl group, an aryl group, or an aralkyl group; X represents a carboxyl group, an alkyl group or a cycloalkyl group; m is an integer of 1 or 2; and n is an integer of from 2 to 500.

As examples of the dihydroxybiphenyls usable in the present invention, 2,2'-dihydroxybiphenyl, 2,2'-dihydroxy-5,5'-dimethylbiphenyl, 2,2'-dihydroxy- 4,4',5,5'-tetramethylbiphenyl, 2,2'-dihydroxy-5,5'-dichlorobiphenyl, 2,2'-dihydroxy-5,5'-dicyclohexylbiphenyl, and 2,2'-dihydroxy-5,5'-di-tert-butylbiphenyl can be mentioned with 2,2'-dihydroxybiphenyl particularly preferable from an industrial point of view.

Examples of the preferable aldehydes for the present invention may be formalin, acetaldehyde, propionaldehyde, butylaldehyde, acrolein, crotonaldehyde, benzaldehyde, furfural, phenylacetoaldehyde, 3-phenylpropionaldehyde and 2-phenylpropionaldehyde. Of these aldehydes, formalin and acetaldehyde are convenient on the industrial and economical ground.

In the present method, a dihydroxybiphenyl and an aldehyde are reacted in the presence of an acid catalyst thereby producing a reaction product. A preferable catalyst for that reaction is a strongly acidic one such as sulfuric acid, hydrochloric acid, perchloric acid, p-toluenesulfonic acid, methanesulfonic acid, and trifluoromethanesulfonic acid with hydrochloric acid and p-toluenesulfonic acid more preferable.

In the practice of the present invention, a more preferable reaction product of a dihydroxybiphenyl and an aldehyde is obtained when the molar ratio of the aldehyde to the dihydroxybiphenyl is not greater than 1.0. A preferable range of the molar ratio is 0.5 to 1.0 mol, more preferably 0.6 to 0.9 mol, of the aldehyde to 1 mol of the dihydroxybiphenyl. If the molar ratio is greater than 1.0, the molecular weight of the resulting reaction product becomes high and the application of the coating fluid becomes difficult while if the molar ratio is 0.5 or below, it is unpreferable because the molecular weight becomes too low and the applied coating is apt to break off.

The reaction of the dihydroxybiphenyl and the aldehyde is carried out advantageously at a temperature in the range of 50° to 200° C. and more preferably 100° to 150° C. In this reaction, sometimes the presence of a common solvent is desirable.

Preferable examples of the solvent include aromatic hydrocarbons such as benzene, toluene, and xylene; halogenated hydrocarbons such as dichloroethane, trichloroethane, and monochlorobenzene; ethers such butyl methyl ether, methoxyethanol, diethylene glycol, and dimethyl ether; and ketones such as methyl ethyl ketone and methyl isobutyl ketone, but the present invention is not restricted to them.

In the present invention, the molecular weight of the reaction product of the dihydroxybiphenyl and the aldehyde is an important factor. According to the results of experiments, a favorable polymer adhesion preventive effect can be obtained when the molecular weight is in the range of 500 to 100,000, and preferably 1,000 to 50,000.

Although the theoretical reason why the adhesion of a polymer can be prevented by applying such a reaction product to a polymerization tank inner wall and the like for vinyl chloride is not clear, it is considered that probably the hydroxyl groups at the side chains of the reaction product have a radical arresting effect thereby preventing vinyl chloride on the interior surface of the polymerization tank from polymerizing.

In the present invention, it is advantageous to apply an aqueous solution of the reaction product of a dihydroxyphenyl and an aldehyde to a polymerization tank inner wall and the like. When the reaction product is used in the form of an aqueous solution, the reaction product is dissolved in an aqueous solution containing 0.1 to 5 wt. % of an alkali metal hydroxide so that its concentration of the solid may be 0.1 to 10 wt. % and then the pH is adjusted to 8 to 3 with an inorganic acid or organic acid.

For the adjustment of the pH, use can be made of an inorganic acid such as hydrochloric acid, sulfuric acid, phosphoric acid, and nitric acid or an organic acid such as ascorbic acid, acetic acid, citric acid, and mercaptopropionic acid.

Instead of the aqueous solution, a solution wherein the reaction product is dissolved in an organic solvent can be applied. As the organic solvent, any organic solvent can be used if it can dissolve the reaction product and does not affect the polymerization reaction and the physical properties of the polymer. For example, tetrahydrofuran, dioxane, methanol, ethanol, acetone, chloroform, or a mixture thereof can be suitably used.

When the coating agent is applied to the inner wall surface of a polymerization tank and the like, preferably after the wall surface to be coated therewith is heated previously to 40° to 100° C., then the coating agent is applied and then the wall surface is washed with water. As the alkali metal hydroxide for dissolving the solid, sodium hydroxide is generally used and is preferable.

In the present method, the reaction product of a dihydroxybiphenyl and an aldehyde is required to be present on the tank wall that will be in contact with the monomer(s). To apply the reaction product, the application is generally carried out by brushing, spraying or the like. Although there is no particular restriction on the coating amount thereof, generally the coating amount is preferably in the range of 0.005 to 10 g/m$^2$, more preferably 0.01 to 5 g/m$^2$, in terms of solids.

Before the start of the processing of each batch of the polymerization, the application may be carried out, or after one application of the coating fluid, two or more batches of the polymerization can be processed after simple washing with water for each batch.

Another coating agent capable being used in the present invention is a co-condensate obtained by reacting an initial condensate of a phenol and an aldehyde with a modifier comprising compounds including at least a hindered phenol. The modifier can contain, in addition to the hindered phenol, a nitrogen-containing compound or a poly-valent phenol.

More particularly, the coating agent can be obtained by subjecting the phenol and aldehyde to an addition reaction and then by adding a modifier to carry out the co-condensation.

In this specification, by "hindered phenol" is meant a monovalent or bivalent hindered phenol such as o-sec.-butylphenol (hereinafter abbreviated to "OSBP") and 4-t-butylcatechol.

As the nitrogen-containing compound, nitrophenol, nitrobenzoic acid, nitrobenzenesulfonic acid, aminophenol, aminobenzoic acid, and aminobenzenesulfonic acid can be mentioned.

Further, as the poly-valent phenol, catechol, resorcin, hydroquinone, pyrogallol and phloroglucin can be mentioned.

In the present invention, using a basic catalyst, a resol type initial condensate of a phenol and an aldehyde is first prepared. In this case, the aldehyde is used in excess over the phenol. Generally, the reaction is carried out at a temperature of 60° to 90° C. for 1 to 6 hours. In this way, a resol having mainly 1 to 5 nuclei is prepared. Modifiers are added to the thus prepared resol and they are reacted at a reaction temperature of 60° to 90° C. until the viscosity reaches a desired molecular weight thereby preparing a coating agent.

In this reaction for obtaining the coating agent, the modifiers, i.e., a hindered phenol, a nitrogen-containing compound, and a poly-valent phenol are added each in an amount ranging from 0.01 to 2.0 mol, preferably 0.02 to 0.8 mol, for 1 mol of the original phenol. If the amount is less than 0.01 mol, the polymer adhesion preventive effect is poor while if the amount exceeds 2.0 mol, it is unpreferable because the excess does not improve the adhesion preventive effect to that extent, on the contrary the cost increases, and the reaction yield lowers.

The weight-average molecular weight of the coating agent is preferably 400 to 12,000, more preferably 600 to 4,000, in terms of weight-average molecular weight (hereinafter abbreviated to "Mw"). If the Mw is less than 400, it becomes water soluble, and therefore it is unpreferable because the applied coating agent will dissolve out and the polymer adhesion preventive effect is poor. On the other hand, if the Mw exceeds 12,000, it is unpreferable because the condensation reaction proceeds highly to allow the condensate to crosslink thereby decreasing the hydrophilic nature and as a result the polymer adhesion preventive effect is poor.

To carry out the present invention, the coating agent is made into an aqueous alkali solution and it is dissolved in a 0.05 to 5 wt. % aqueous alkali metal or alkali metal earth hydroxide solution so that the concentration of the coating agent may be 0.1 to 10.0 wt. %, preferably 0.2 to 6.0 wt. %. When the concentration of the coating agent is less than 0.1 wt. %, it is not preferable because the amount of the liquid to be applied is too large, leading to a decrease in workability, and the polymer adhesion preventive effect becomes poor. On the other hand, if the concentration exceeds 10.0 wt. %, it becomes difficult to apply the coating agent on the wall surface throughout and the coating amount increases, which is not economical, and further when the washing with water after the application is not sufficient, the component dissolves out and it affects adversely the quality of the product. By "alkali metal or alkali earth metal hydroxide" is meant preferably sodium hydroxide, potassium hydroxide, or calcium hydroxide with sodium hydroxide more preferable, which is generally used in the form of an aqueous solution. In another mode of the present invention, a coating agent to be applied to the inner wall surface of a polymerization tank and the like is an aqueous alkali solution containing a co-condensate with phenolic hydroxide groups, the pH at which the co-condensate will deposit from the solution is 8.0 or over and the deposition degree of the co-condensate is 35% or below. Herein, by "deposition degree" is used to mean the ratio (wt. %) of the amount of water in the total amount of the solution. The deposition degree is determined as the amount to make the solution opaque by precipitation of the coating agent, the solution being prepared by separating the coating agent form the reaction product by addition of acid, dissolving the separated coating agent in methanol and adjusting the concentration of the coating agent to 0.4%.

Preferably, said co-condensate is one having a weight-average molecular weight of 500 to 10,000 obtained by reacting an initial condensate of a phenol and an aldehyde with a hindered phenol and a poly-valent phenol in the presence of a strongly acidic catalyst.

When instead of formaldehyde an aldehyde that is the reaction medium for the organic compound having a hydroxyl group such as a phenol, a hindered phenol, and a poly-valent phenol used in the present invention is used, the pH at which the coating agent in the aqueous solution containing the coating agent will deposit becomes 8.0 or over and the deposition degree will be lowered to 35% or below. By doing this, it is supposed that after the application of the coating fluid, the coating agent deposits and adheres firmly onto the wall surface and the like when washing with water is carried out since the pH of water is generally 5 to 7 and the deposit does not dissolve out thereafter during the polymerization reaction of vinyl chloride.

It is considered that the hindered phenol and other poly-valent phenol are arranged effectively in the skeleton of the resol in the presence of a strongly acidic catalyst and a stable coating agent is made.

Although the mechanism of the prevention of the polymer adhesion is not clear, it is considered that when the coating agent is applied to the wall surface, a thin film of the coating agent adheres to the wall surface firmly and exhibits a radical arresting effect or since it is hydrophilic, the wall surface exhibits oil repellency to repel vinyl chloride monomer.

Since it is considered that the coating agent has partially a three-dimensional structure, it hardly dissolves out into the polymerization reaction liquid of vinyl chloride and it is sure that the polymerization rate is not made lower. Examples of the phenol used in the synthesis of the coating agent of the present invention include monovalent phenols such as phenol, cresol, and ethylphenol, bivalent phenols such as resorcin and hydroquinone, and bisphenols such as bisphenol A and their substituted products, which may be used alone or in combination.

The aldehyde includes organic compounds having a CHO— group such as, acetaldehyde, benzaldehyde and furfural, which may be used alone or in combination.

In the synthesis of the initial condensate of a phenol and an aldehyde, a catalyst is used. As the catalyst, a basic catalyst is used such as sodium hydroxide, potassium hydroxide, ammonia, and an amine, which may be used alone or in combination. Of these, sodium hydroxide is generally used and is preferable because it is industrially inexpensive and readily available.

As described above, a phenol and an aldehyde are subjected to an addition reaction (hereinafter abbreviated to "first reaction"), then a hindered phenol and a poly-valent phenol are added and they are subjected to a co-condensation reaction (hereinafter referred to as "second reaction").

By "a hindered phenol" is meant a monovalent or bivalent hindered phenol such as o-s-butylphenol and 4-t-butylcatechol. The poly-valent phenol includes, for example, catechol, resorcin, hydroquinone, pyrogallol, and phloroglucin.

Example of the strongly acidic catalyst includes sulfuric acid, hydrochloric acid, perchloric acid, p-toluenesulfonic acid, methanesulfonic acid, and trifluoromethanesulfonic acid with hydrochloric acid and p-toluenesulfonic acid preferable. In the present invention, using a basic catalyst, a resol type initial condensate of a phenol and an aldehyde is first prepared. In this case, the aldehyde is used in excess over the phenol. Preferably, 1.1 to 3.0 mol, more preferably 1.2 to 2.0 mol, of an aldehyde is used for 1.0 mol of a phenol. Preferably, the basic catalyst is used in an amount of 0.02 to 0.5 mol, more preferably 0.05 to 0.3 mol, for 1.0 mol of a phenol.

Generally, the reaction is carried out at a temperature of 70° to 150° C. for 1 to 6 hours. In this way, a resol having mainly 1 to 5 nuclei is prepared. A hindered phenol and a poly-valent phenol are added to the thus prepared resol and they are reacted at a reaction temperature of 70° to 150° C. for 1 to 6 hours in the presence of a strongly acidic catalyst thereby preparing a coating agent. In the second reaction, the hindered phenol and the poly-valent phenol are added each in an amount ranging from 0.01 to 2.0 mol, preferably 0.02 to 0.8 mol, for 1 mol of the original phenol. If the amount is less than 0.01 mol, the polymer adhesion preventive effect is poor while if the amount exceeds 2.0 mol, it is unpreferable because the excess does not improve the adhesion preventive effect to that extent, on the contrary the cost increases, and the reaction yield lowers.

Further, the strongly acidic catalyst is preferably used in an amount of 0.02 to 0.5 mol, preferably 0.05 to 0.3 mol, for 1.0 mol of the original phenol.

The features of the reaction for obtaining the coating agent are that the aldehyde used in the first reaction is other than formaldehyde, the catalyst of the second reaction is a strongly acidic catalyst, and when the ratio of the catalyst of the first reaction to the catalyst of the second reaction is lowered, the second reaction proceeds highly while, when the ratio is increased, the second reaction is difficult to proceed.

The weight-average molecular weight of the coating agent is preferably 500 to 10,000, more preferably 600 to 5,000, in terms of weight-average molecular weight (Mw). If the Mw is less than 500, it becomes water-soluble, and therefore it is unpreferable because the applied coating agent will dissolve out and the polymer adhesion preventive effect is poor. On the other hand, if the Mw exceeds 10,000, it is unpreferable because the condensation reaction proceeds highly to allow the condensate to crosslink thereby decreasing the hydrophilic nature and as a result the polymer adhesion preventive effect is poor.

To carry out the present invention, the coating agent is made into an aqueous alkali solution and it is dissolved in a 0.05 to 5 wt. % aqueous alkali metal or alkali metal earth hydroxide solution so that the concentration of the coating agent may be 0.1 to 10.0 wt. %, preferably 0.2 to 6.0 wt. %. When the concentration of the coating agent is less than 0.1 wt. %, it is not preferable because the amount of the liquid to be applied becomes too large, leading to a decrease in workability, and the polymer adhesion preventive effect becomes poor. On the other hand, if the concentration exceeds 10.0 wt. %, it becomes difficult to apply the coating agent on the wall surface throughout and the coating amount increases, which is not economical, and further when the washing with water after the application is not sufficient, the component dissolves out and it affects adversely the quality of the product. Herein, as alkali metal or alkali earth metal hydroxide, various ones can be mentioned, and, for example, sodium hydroxide, potassium hydroxide, or calcium hydroxide is used with sodium hydroxide more preferable, which is generally used in the form of an aqueous solution. An excellent coating agent capable of preventing effectively the adhesion of a polymer can be prepared by diluting the reaction product, which is obtained in the form of an aqueous alkali solution after the completion of the reaction that has produced the condensate modified in the above manner, with water, adding an acid to the resulting solution to adjust the pH to allow the condensate to deposit, separating the deposit, and dissolving the deposit in a solvent. A preferable solvent is an organic solvent and an aqueous alkali solution. The alkali solution contains an alkali in an amount of 1 to 20 times the minimum concentration in the range where a prescribed amount of the deposit can be dissolved.

In the preparation of the coating agent, it is important that the modified phenolic resin is deposited effectively from the reaction product. That is, when the pH is adjusted by adding an acid to the reaction product, it is desired to adjust the concentration of the modified phenolic resin in the reaction product prior to the adjustment of the pH. Preferably, the concentration range is 3 to 20 wt. %, and more preferably 5 to 15 wt. %. If the concentration is 3 wt. % or below, the particles of the deposited modified phenolic resin become too fine and therefore the filtration is not easy. On the other hand, if the concentration exceeds 20 wt. %, sometimes a large amount of the modified phenolic resin deposits solidly on the bottom of the container and the succeeding operation becomes difficult.

Suitable deposition of the modified phenolic resin is carried out by bringing the pH of the diluted reaction product by the addition of an acid preferably to 1.0 to 5.0, and more preferably 1.5 to 3.0. If the pH is less than 1.0, even when the separated modified phenolic resin is washed with water, the risk that it corrodes the surface of the polymerization tank and the like, when applied thereto in the form of a solution in an organic solvent, and the yield of the modified phenolic resin is not improved. On the other hand, if the pH exceeds 5.0, the yield of the modified phenolic resin decreases. The acid used for adjusting the pH is suitably a strong acid and particularly preferably hydrochloric acid and sulfuric acid. The modified phenolic resin deposited from the reaction product is freed from impurities such as water, acids, unreacted matters, and water-soluble oligomers by filtering under vacuum or centrifuging. Then, the modified phenolic resin is washed with water of 10° to 70° C. The washing is intended to remove remaining impurities and although usually the washing is carried out with water of normal temperatures, when the use of water of high temperatures is used, the efficiency is better. The modified phenolic resin washed with water is dried, and if desired, ground, and it is dissolved in an organic solvent or an aqueous alkali solution to form a coating fluid.

(1) When it is dissolved in an organic solvent:

The concentration of the coating agent in the organic solvent is preferably 0.03 to 3.0 wt. %, and more preferably 0.06 to 1.5 wt. %. If the concentration is less than 0.03 wt. %, the amount of the coating fluid required becomes too large, therefore the workability decreases, and in addition, a good polymer adhesion preventive effect cannot be obtained. On the other hand, if the concentration exceeds 3.0 wt. %, parts where the coating amount of the coating fluid is excessive are liable to occur, as a result a larger amount of the coating agent than needed is applied, which is uneconomical, and in addition, it takes longer to carry out the polymerization of vinyl chloride, resulting in disadvantages such as coloring of the product.

A suitable coating amount of the coating agent for the wall surface of a polymerization tank and the like is 0.02 to 8.0 $g/m^2$, and more preferably 0.05 to 4.0 $g/m^2$.

The organic solvent to be used is selected from those which can dissolve the modified phenolic resin and does not unfavorably influence the modified phenolic resin. Preferable examples of the organic solvent include tetrahydrofuran, dioxane, methanol, ethanol, acetone, chloroform, and a mixture obtained by arbitrarily combining these.

(2) When it is dissolved in an aqueous alkali solution:

The solubility of the modified phenolic resin in an aqueous alkali solution increases as the concentration of the alkali in the aqueous alkali solution increases. In the present invention, an aqueous alkali solution containing an alkali required for dissolving the required amount of the modified phenolic resin is used. The concentration of the modified phenolic resin in the aqueous alkali solution is preferably 0.1 to 8.0 wt. %, and more preferably 0.2 to 4.0 wt. %. If the concentration is less than 0.1 wt. %, a larger amount of the coating fluid is required, therefore the workability decreases, and in addition, a good polymer adhesion preventive effect cannot be obtained. On the other hand, if the concentration exceeds 8.0 wt. %, parts where the coating amount of the coating fluid is excessive are liable to occur, as a result a larger amount of the coating agent than needed is applied, which is uneconomical, and in addition, it takes much time to carry out the polymerization of vinyl chloride, resulting in disadvantages such as coloring of the product.

A preferable alkali concentration required for dissolving the modified phenolic resin is in the range of 0.01 to 2.0 wt. %. In an instance wherein sodium hydroxide is used as an alkali, the required minimum alkali concentration is in the range of 0.01 to 2.0 wt. %, which value varies in accordance with the concentration of the modified phenolic resin. For example, if the concentrations of the modified phenolic resin are 4.0, 2.0, and 1.0 wt. %, suitable concentrations of the aqueous sodium hydroxide solution are 0.15, 0.10, and 0.05 wt. % respectively.

The alkali is preferably used in the amount of, 1 to 20 times, more preferably 1 to 10 times the minimum concentration. If the amount of the alkali used is in excess of 20 times the minimum concentration, then the effect of prevention of the adhesion of the polymer will be decreased.

In addition to sodium hydroxide, potassium hydroxide and calcium hydroxide are advantageously used as alkalis.

According to the present method, it is not required to carry out high pressure water washing after the completion of the processing of each batch so as to remove a polymer adhered to the polymerization tank, and only when the inside of the polymerization tank is washed simply with water, the adhesion of a polymer can be prevented quite effectively with the conventional polymerization rate retained, and there is no adverse influence on the quality of the obtained product, which is industrially valuable.

The present invention will now be described more specifically with reference to Examples.

However, the Examples are simply for illustration and the present invention is not restricted to them.

In the Examples, all of the percentages are percentages by weight unless otherwise indicated.

EXAMPLES

Preparation Example 1

(An initial condensate of phenol/aldehyde)

100.0 g (1.064 mol) of phenol, 129.4 g (1.596 mol) of 37.0% formalin, and 1.7 g (0.043 mol) of sodium hydroxide were charged into a three-necked flask with a reflux condenser and the temperature was elevated to 85° C. over 30 min. with stirring. The reaction was allowed to continue for two and half hours with that temperature kept. The viscosity of the thus obtained resol was measured at 85° C. by a Brookfield type viscometer and was found to be 10 cps. The residual formaldehyde was analyzed by the sodium sulfite method and was found to be 0.12%. The weight-average molecular weight (Mw) measured by gel permeation chromatography was 420.

Preparation Example 2

(A resol type coating agent)

200 g of the resol obtained in Preparation Example 1 was charged into a three-necked flask with a reflux condenser, 20 g of resorcin as a modifier was added thereto, the mixture was heated to 85° C. over 30 min. with stirring, and the condensation reaction was continued with that temperature kept. When the viscosity reached 1,000 cps, which was measured by a Brookfield type viscometer, the temperature was lowered and an aqueous sodium hydroxide solution was added to terminate the reaction. The pH of the obtained condensate was 11.1 and the Mw was 1,550.

Example 1

The condensate obtained in Preparation Example 2 was used as a coating agent to prepare a 0.2 wt. % aqueous sodium hydroxide solution containing 2 wt. % of it. The pH of the thus obtained aqueous alkali solution was adjusted to 7.0 with citric acid to prepare a coating fluid.

On the other hand, the jacket of a stainless steel polymerization tank having an internal volume of 7 liters and with agitating blades and baffles was heated to bring the temperature of the inner wall of the polymerization tank and the like to 70° C., and parts of the polymerization tank including the inner wall, the agitating blades, the baffles, and various attached pipeline connecting sections that would be in contact with vinyl chloride monomer which would be charged afterward were sprayed with the coating fluid using a spray in an amount of 0 5 $g/m^2$, and then were sprayed with water to rinse the coating.

3,000 g of deionized water, 0.89 g of di-2-ethylhexylperoxy-di-carbonate, 0.28 g of cumyl peroxyneodecanoate, and 2 g of partially saponified polyvinyl alcohol having a degree of saponification of 80% were charged into the polymerization tank having the thus formed coating and the air in the polymerization tank was removed by a vacuum pump. Thereafter, 2,000 g of vinylchloride was charged thereinto and the reaction was continued at 58° C. until the pressure reached 6.5 $kg/cm^2$-G. After the completion of the reaction, unreacted monomer was recovered, and after the slurry was discharged, the polymerization tank inner wall and the like were rinsed with water. The same polymerization was followed twice without carrying out the application of the coating fluid. Thereafter the same polymerization was similarly repeated four times successively. Then, the weight of the polymer adhered to the polymerization tank inner wall and the like was measured and was found to be 0.4 g/m². The slurry was dehydrated and dried to obtain a product and physical properties thereof were measured by the testing methods given below. According to the present method, the adhered amount of the polymer could be reduced conspicuously and the polymer adhered could be easily washed away by simple washing with water. The reaction time was not prolonged and the physical properties of the obtained product were excellent. The results are shown in Table 1.

Comparative Example 1

The same polymerization as the first polymerization of Example 1 was carried out, except that the application of the coating fluid was not performed. As apparent from the results shown in Table 1, the adhered amount of the polymer was quite large.

Comparative Example 2

Example 1 was repeated, except that when the coating fluid was applied, the polymerization tank inner wall and the like were not heated to 70° C. and were allowed to be at normal temperatures. As apparent from the results shown in Table 1, the adhered amount of the polymer was rather large.

Preparation Example 3

(A coating fluid)

55.9 g (0.30 mol) of 2,2'-dihydroxybiphenyl, 7.11 g (0.225 mol) of paraformaldehyde having a purity of 95%, 1.9 g of paratoluenesulfonic acid, and 100 ml of diethylene glycol dimethyl ether were charged into a reactor equipped with a thermometer and a stirrer and were reacted at a temperature of 125° to 130° C. for 17 hours. After the completion of the reaction, the contents were cooled and discharged into 500 of water to deposit a resin.

It was filtered, washed with water, and then dried to obtain 52 g of 2,2'-dihydroxybiphenyl/formalin condensation resin. The average molecular weight thereof was 4200. The resin was dissolved in methanol to adjust the solid concentration to 0.4 wt. %.

Preparation Example 4

(A coating fluid)

The 2,2'-dihydroxybiphenyl/formalin condensation resin of Preparation Example 3 for a coating fluid was dissolved in a 0.4 wt. % aqueous NaOH solution to adjust the solid concentration to 2% and the pH was adjusted with ascorbic acid to 5.0.

Preparation Example 5

(A coating fluid)

Preparation Example 3 for a coating fluid was repeated, except that 2,2'-dihydroxy-5,5'-dichlorobiphenyl and acetaldehyde were used with the molar ratio thereof being 1/0.6. The reaction product had an average molecular weight of 2,400. The resin was dissolved in methanol to adjust the solid concentration to 0.4%.

Preparation Example 6

(A coating fluid)

The same 2,2'-dihydroxy-5,5'-dichlorobiphenyl acetaldehyde condensation resin as that of Preparation Example 5 for a coating fluid was dissolved in a 0.4% aqueous NaOH solution to adjust the solid concentration to 2% and the pH was adjusted with citric acid to 5.0.

Preparation Example 7

(A coating fluid)

Preparation Example 3 for a coating fluid was repeated, except that 2,2'-dihydroxy-4,4',5,5'-tetramethylbiphenyl and formalin were used with the molar ratio thereof being 1/0.7. The average molecular weight of the reaction product was 3,500. The resin was dissolved in methanol to adjust the solid concentration to 0.4%.

Preparation Example 8

2,2'-dihydroxy-4,4',5,5'-tetramethylbiphenyl formalin condensation resin that was the raw material of Preparation Example 7 for a coating fluid was dissolved in a 0.5% aqueous NaOH solution to adjust the solid concentration to 2% and the pH was adjusted with phosphoric acid to 6.0.

Example 2

The coating fluid prepared in Preparation Example 3 for a coating fluid was sprayed by a spray on the inner wall of a stainless steel polymerization tank having an internal volume of 7l and then the methanol was distilled off under vacuum.

Thereafter, 3,000 g of deionized water, 0.6 g of t-butyl peroxypivalate, and 2 g of partially saponified polyvinyl alcohol having a degree of saponification of 80% were charged and the air therein was discharged under vacuum. Then, 2,000 g of vinyl chloride was charged and the reaction was continued at 57° C. until the pressure reached 5 kg/cm²-G.

After the completion of the reaction, unreacted monomer was recovered, the polymer slurry was removed, and then the weight of the polymer adhered to the polymerization tank inner wall was checked. The polymer slurry was dehydrated and dried to obtain a product. The results are shown in Table 2.

As shown in Table 2, according to the present invention, the adhered amount of the polymer was notably small and the adhered polymer could easily be washed away by simple washing with water.

The reaction time was not prolonged and the physical properties of the obtained product were excellent.

Comparative Example 3

The polymerization reaction of Example 2 was repeated, except that the application of the coating fluid was not carried out at all. As shown in Tables 2 and 3, the amounts of the polymer adhered to the inner wall were quite large.

Example 3

The inner wall of a stainless steel polymerization tank having an internal volume of 7 liters was heated to 70° C. by using the jacket, the coating fluid adjusted in Preparation Example 4 for a coating fluid was applied to the inner wall by a spray, and the coating was washed with water. After this treatment, the same polymerization reaction as that of Example 2 was carried out. The results are shown in Table 2. In this Example, the adhered amount of the polymer was also notably small and the adhered polymer could also easily be washed away by simple washing with water. The reaction time was not prolonged and the physical properties of the obtained product were excellent.

Example 4

Example 2 was repeated, except that the coating fluid prepared in Preparation Example 5 for a coating fluid was used. The results are shown in Table 3. In this Example, the adhered amount of the polymer was also notably small and the adhered polymer could also easily be washed away by simple washing with water.

Example 5

Example 3 was repeated, except that the coating fluid prepared in Preparation Example 6 for a coating fluid was used. The results are shown in Table 3. In this Example, the adhered amount of the polymer was also notably small and the adhered polymer could also easily be washed away by simple washing with water. The reaction time was not prolonged and the physical properties of the obtained product were excellent.

Example 6

Example 2 was repeated, except that the coating fluid prepared in Preparation Example 7 for a coating fluid was used. The results are shown in Table 3. In this Example, the adhered amount of the polymer was also notably small and the adhered polymer could also easily be washed away by simple washing with water. The reaction time was not prolonged and the physical properties of the obtained product were excellent.

Example 7

Example 3 was repeated, except that the coating fluid prepared in Preparation Example 8 for a coating fluid was used.

The results are shown in Table 3. According to the present invention, the adhered amount of the polymer was notably small and the adhered polymer could also easily be washed away by simple washing with water. The reaction time was not prolonged and the physical properties of the obtained product were excellent.

Preparation Example 9

(An initial condensate of phenol/aldehyde)

282.0 g (3.00 mol) of phenol, 356.8 g (4.40 mol) of 37.0% formalin, and 4.8 g (0.12 mol) of sodium hydroxide were charged into a three-necked flask equipped with a reflux condenser and the temperature was elevated to 85° C. over 30 minutes with stirring. The reaction was allowed to continue for two hours and forty minutes with that temperature kept. The viscosity of the thus obtained resol was measured at 85° C. by a Brookfield type viscometer and was found to be 10.4 cps. The residual formaldehyde was analyzed by the sodium sulfite method and was not found. The Mw measured by gel permeation chromatography was 410.

Preparation Example 10

(A resol type coating agent)

Using the resol obtained in Preparation Example 9, a coating fluid which was a 0.2% aqueous sodium hydroxide solution having a coating agent concentration of 2.0% was prepared.

Preparation Example 11

(A co-condensate of resorcin and benzaldehyde)

100 ml of 1,4-dioxane and 50 g of resorcin were charged into a three-necked flask equipped with a reflux condenser, then 32 ml of benzaldehyde was added, and the mixture was stirred. Then, 1 ml of a 50% aqueous sodium hydroxide solution was added. The bath temperature was elevated to 120° C. and the mixture was refluxed for 1 hour. Then, the condenser was replaced with a distillation head and the water/dioxane were distilled off. Thereafter, the reaction product was cooled and was dissolved in a dilute aqueous sodium hydroxide solution.

Hydrochloric acid was then added to deposit the coating agent and the coating agent was filtered, dried, and ground. The coating agent was dissolved in a 1.0% aqueous sodium hydroxide solution to prepare a coating fluid having a coating agent concentration of 1.0%.

Preparation Example 12

(A resol type coating agent)

200.0 g of resol prepared in Preparation Example 9 was charged into a three-necked flask equipped with a reflux condenser, 6.9 g (0.046 mol) of OSBP as a modifier was added thereto, the mixture was heated to 75° C. over 20 min. with stirring, and the reaction was continued with that temperature kept. When the viscosity measured by a Brookfield type viscometer reached 1300 cps, the temperature was lowered, and the reaction was terminated by putting an aqueous sodium hydroxide therein. Using the reaction product, a coating fluid which was a 0.2% aqueous sodium hydroxide solution having a coating agent concentration of 2.0% was prepared.

Preparation Examples 13 to 15

(Resol type coating agents)

200.0 g of resol obtained in Preparation Example 9 was charged into each of three three-necked flasks equipped with a flux condenser. In Preparation Example 13, as modifier, 6.9 g (0.046 mol) of OSBP and 12.6 g (0.092 mol) of p-aminobenzoic acid were added to one of the flasks, in Preparation Example 14, as modifier, 6.9 g (0.046 mol) of OSBP and 29.0 g (0.23 mol) of pyrogallol were added to one of the remaining flasks, and in Preparation Example 15, as modifier, 6.9 g (0.046 mol) of OSBP, 15.9 g (0.092 mol) of orthanilic acid, and 10.1 g (0.092 mol) of resorcin were added to the remaining flask. They were heated to 75° C. over 20 minutes with stirring and the reaction was continued with that temperature kept. When the viscosity measured by a Brookfield type viscometer reached 1,300 cps, the temperature was lowered, and by adding an aqueous sodium hydroxide solution thereto the reaction was terminated.

Using the reaction products, coating fluids which were 0.2% aqueous sodium hydroxide solutions each having a coating agent concentration of 2.0% were prepared.

Example 8

Parts of a stainless steel polymerization tank equipped with agitating blades and baffles and having an internal volume of 7-1 that included the inner wall, the agitating blades, the baffles, and various attached pipeline connecting sections and would be in contact with vinyl chloride monomer which would be charged afterward were sprayed with the coating fluid obtained in Preparation Example 12 using a spray so that the amount of the coating agent might be 0.5 g/m$^2$, and then were sprayed with water to rinse the coating.

3,000 g of deionized water, 0.89 g of di-2-ethylhexylperoxy-di-carbonate, 0.28 g of cumyl peroxyneodecanoate, and 2 g of partially saponified polyvinyl alcohol having a degree of saponification of 80% were charged into the polymerization tank having the thus formed coating and the air in the polymerization tank was removed by a vacuum pump. Thereafter, 2,000 g of vinyl chloride was charged thereinto and the reaction was continued at 58° C. until the pressure reached 6.5 kg/cm$^2$-G. After the completion of the reaction, unreacted monomer was recovered, and after the slurry was discharged, the polymerization tank inner wall and the like were rinsed with water. Thereafter, the weight of the polymer adhered to the polymerization tank inner wall and the like was measured and was found to be 3.7 g/m$^2$. The slurry was dehydrated and dried to obtain a product and physical properties thereof were measured by the testing methods given below. The results are shown in Table 4.

Comparative Example 4

The polymerization of Example 8 was repeated, except that the application of the coating fluid was not carried out.

As apparent from the results shown in Table 4, the adhered amount of the polymer was quite as high as 45 g/m$^2$.

Comparative Example 5

The polymerization of Example 8 was repeated, except that, instead of the coating fluid used in Example 8 obtained in Preparation Example 12, the coating fluid obtained in Preparation Example 10 was used. As apparent from the results shown in Table 4, the adhered amount of the polymer was 12.7 g/m$^2$, which was better than that of Comparative Example 4. However it is not practical.

Comparative Example 6

The polymerization of Example 8 was repeated, except that, instead of the coating fluid obtained in Preparation Example 12, the coating fluid obtained in Preparation Example 11 was used.

As apparent from the results shown in Table 4, the adhered amount of the polymer was 14.3 g/m$^2$, which was better than that of Comparative Example 1. However it is not practical.

Examples 9 and 10

Instead of the coating fluid used in Example 8 obtained in Preparation Example 12, the coating fluids obtained in Preparation Examples 13 and 14 were used. The polymerization of Example 8 was repeated twice, but the second polymerization in each of Examples 9 and 10 was carried out without the application of the coating fluids.

As apparent from the results shown in Table 4, the adhered amount of the polymer was as small as 1.3 to 2.5 g/m$^2$. In both cases, the polymer adhered could be easily washed away by simple washing with water. The reaction time was not prolonged and the physical properties of the obtained product were excellent.

Example 11

Instead of the coating fluid used in Example 8 obtained in Preparation Example 12, the coating fluid obtained in Preparation Example 15 was used.

The polymerization in Example 8 was repeated four times successively, but the second, third, and fourth polymerization operations in Example 11 were carried out without the application of the coating fluid.

As apparent from the results shown in Table 4, the adhered amount of the polymer was 0.4 g/m$^2$, which was notably small. The polymer adhered could be easily washed away by simple washing with water. The reaction time was not prolonged and the physical properties of the obtained product were excellent.

Preparation Example 16

65.0 g (0.691 mol) of phenol, 110.0 g (1.038 mol) of benzaldehyde, 93.6 g of water, and 4.8 g (0.120 mol) of sodium hydroxide were charged into a 500 ml autoclave equipped with a thermometer and a stirrer and the mixture was heated to 130° C. over 45 min. with stirring. The reaction was performed for 3 hours with that temperature kept.

Thereafter, the mixture was cooled, and when the internal temperature reached 60° C., 2.6 g (0.017 mol) of OSBP, 24.4 g (0.194 mol) of pyrogallol, and 27.5 g (0.145 mol) of 95.6% p-toluenesulfonic acid were charged, then the temperature was elevated gradually, and the reaction was continued at 100° C. for 2 hours.

Thereafter the temperature was lowered, and by adding an aqueous sodium hydroxide solution thereto the reaction was terminated. Physical properties of the thus obtained reaction product were measured by the measuring method below mentioned. The results are shown in Table 5.

Using the reaction product, a coating fluid Which was a 0.4 wt. % aqueous sodium hydroxide solution having a coating agent concentration of 2.0 wt. % was prepared.

Preparation Examples 17 and 18

100.0 g (1.064 mol) of carbolic acid, 52.7 g of water, and 4.3 g (0.108 mol) of sodium hydroxide were charged into each of two 500 ml autoclaves each equipped with a thermometer and a stirrer and each mixture was heated to 90° C. over 30 min. with stirring. After keeping that temperature for 10 min., 87.8 g (1.596 mol) of 80% acetaldehyde was charged into each mixture uniformly over 45 min.

The reaction was further continued for 3 hour with the temperature kept at 90° C. Thereafter each mixture was cooled, and when the internal temperature reached 50° C., in Preparation Example 17, 4.0 g (0.027 mol) of OSBP, 26.8 g (0.213 mol) of pyrogallol, and 32.4 g (0.171 mol) of 95.6% p-toluenesulfonic acid were charged thereinto, and in Preparation Example 18, 4.0 g (0.027 mol) of OSBP, 11.7 g (0.106 mol) of resorcin, and 10.8 g (0.107 mol) of 36% hydrochloric acid were charged thereinto. The temperature was elevated gradually and the reaction was continued for 4 hours at 85° C. Temperature was lowered, and by adding an aqueous sodium hydroxide solution thereto the reaction was terminated.

Physical properties of the thus obtained reaction products were measured by the measuring method below mentioned. The results are shown in Table 5.

Using the reaction products, coating fluids which were 0.4% aqueous sodium hydroxide solutions each having a coating agent concentration of 2.0% were prepared.

Preparation Example 19

94.0 g (1.000 mol) of carbolic acid, 121.6 g (1.500 mol) of 37.0% formalin, and 1.6 g (0.40 mol) of sodium hydroxide were charged into a three-necked flask equipped with a reflux condenser and the temperature was elevated to 85° C. over 30° C. with stirring. The reaction was allowed to continue for two hours and 40 min with that temperature kept. The viscosity of the thus obtained resol was measured at 85° C. by a Brookfield type viscometer and was found to be 10 cps. The residual formaldehyde was analyzed by the sodium sulfite method and it was not found. The weight-average molecular weight measured by gel permeation chromatography was 420.

Thereafter, the mixture was cooled, and when the internal temperature reached 50° C., 3.8 g (0.025 mol) of OSBP and 29.0 g (0.230 mol) of pyrogallol were charged into it, then the temperature was elevated gradually, and the reaction was continued at 75° C.

When the viscosity measured by a Brookfield type viscometer reached 1,300 cps, the temperature was lowered, and by adding an aqueous sodium hydroxide solution thereto the reaction was terminated. Physical properties of the obtained reaction product are shown in Table 5.

Using the reaction product, a coating fluid which was a 0.4% aqueous sodium hydroxide solution having a coating agent concentration of 2.0% was prepared.

Preparation Example 20

100.0 g (1.064 mol) of carbolic acid, 52.7 g of water, and 4.3 g (0.108 mol) of sodium hydroxide were charged into a 500 ml autoclave equipped with a thermometer and a stirrer and the mixture was heated to 90° C. over 30 min with stirring. After keeping that temperature for 10 min, 87.8 g (1.596 mol) of 80% acetaldehyde was charged into the mixture uniformly over 45 min.

The reaction was further continued for 3 hour with the temperature kept at 90° C. Thereafter the mixture was cooled, and when the internal temperature reached 70° C., 4.0 g (0.027 mol) of OSBP, 26.8 g (0.213 mol) of pyrogallol, and 20.5 g (0.107 mol) of 90% orthanilic acid were charged thereinto, then the temperature was elevated gradually and the reaction was continued for 4 hours at 150° C.

Thereafter the temperature was lowered, and by adding an aqueous sodium hydroxide solution thereto the reaction was terminated. Although physical properties of the thus obtained reaction product are shown in Table 5, since the reaction yield was as low as 44.9%, it was discarded.

Example 12

Parts of a stainless steel polymerization tank equipped with agitating blades and baffles and having an internal volume of 7-1 that included the wall surface, etc. and would be in contact with vinyl chloride monomer which would be charged afterward were sprayed with the coating fluid obtained in Preparation Example 16 using a spray so that the amount of the coating agent might be 0.5 g/m$^2$, and then they were sprayed with water to rinse the coating.

3,000 g of deionized water, 0.89 g of di-2-ethylhexylperoxydicarbonate, 0.28 g of cumyl p eroxyneodecanoate, and 2 g of partially saponified polyvinyl alcohol having a degree of saponification of 80% were charged into the polymerization tank having the thus formed coating and the air in the polymerization tank was removed by a vacuum pump. Thereafter, 2,000 g of vinyl chloride was charged thereinto and the reaction was continued at 58° C. until the pressure reached 6.5 kg/m$^2$-G. After the completion of the reaction, unreacted monomer was recovered, and after the slurry was discharged, the inner wall and the like were rinsed with water.

Then, a second polymerization that was the same as the above first polymerization was effected by charging raw materials without applying the coating fluid. Further, similarly a third, a fourth, and a fifth polymerization were carried out successively, that is, the polymerization was repeated five times.

Then, the weight of the polymer adhered to the polymerization tank inner wall and the like was measured and was found to be 0.5 g/m$^2$. The slurry was dehydrated and dried to obtain a product and physical properties thereof were measured by the testing methods given below.

According to the present method, the adhered amount of the polymer could be reduced notably and the polymer adhered could be easily washed away by simple washing with water. The reaction time was not prolonged and the physical properties of the obtained product were excellent.

The results are shown in Table 6.

Examples 13 and 14

Example 12 was repeated, except that, instead of the coating fluid used in Example 12 obtained in Preparation Example 16, the coating fluids obtained in Preparation Examples 17 and 18 were used.

As apparent from the results shown in Table 6, the adhered amounts of the polymer were as notably small as 0.4 to 0.8 g/m$^2$. In both cases, the adhered polymer could be easily washed away by simple washing with water. The reaction time was not prolonged and the physical properties of the obtained product were excellent.

Comparative Example 7

Example 12 was repeated, except that the application of the coating fluid was not carried out and the polymerization was carried out only once.

As apparent from the results shown in Table 6, the adhered amount of the polymer was as quite high as 45 g/m$^2$.

Example 15

Example 12 was repeated, except that, instead of the coating fluid used in Example 12 obtained in Preparation Example 16, the coating fluid obtained in Preparation Example 19 was used.

As apparent from the results shown in Table 6, the adhered amount of the polymer was 13.4 g/m$^2$, which is far better than that of Comparative Example 7 but is inferior to those of Examples 12 to 14.

Preparation Example 21

(An initial condensate of phenol/aldehyde)

188.0 g (2.00 mol) of phenol, 237.6 g (2.93 mol) of 37.0% formalin, and 3.2 g (0.08 mol) of sodium hydroxide were charged into a three-necked flask equipped with a reflux condenser and the temperature was elevated to 85° C. Over 30 minutes with stirring. The reaction was allowed to continue for two hours and 40 min with that temperature kept.

The viscosity of the thus obtained resol was measured at 85° C. by a Brookfield type viscometer and was found to be 10 cps. The residual formaldehyde was analyzed by the sodium sulfite method but was not detected. The weight-average molecular weight measured by gel permeation chromatography was 410.

Preparation Example 22

(A methanol solution of a resol type coating agent)

200 g of the resol obtained in Preparation Example 21 was charged into a three-necked flask with a reflux condenser, 6.9 g (0.046 mol) of OSBP, 12.6 g (0.092 mol) of p-aminobenzoic acid, and 29 g (0.23 mol) of pyrogallol were added thereto, the mixture was heated to 75° C. over 20 minutes with stirring, and the reaction was continued with that temperature kept. When the viscosity reached 1,300 cps, which was measured by a Brookfield type viscometer, the temperature was lowered and an aqueous sodium hydroxide solution was added to terminate the reaction.

The coating agent concentration of the reaction product was 25%. It was diluted with water three times. Thereafter, 6N hydrochloric acid was added with stirring to adjust the pH to 2.0 thereby depositing a coating agent. The deposit was filtered under vacuum, washed with water of normal temperatures, dried, and ground to obtain a brown powdery substance. The Mw was 1370. Part of the brown powdery substance was dissolved in methanol to prepare a coating fluid having a coating agent concentration of 0.4%.

Preparation Example 23

(An aqueous alkali solution of a resol type coating agent)

Part of the brown powdery substance that was the product in Preparation Example 22 was dissolved in a 0.1% aqueous sodium hydroxide solution, whose concentration was the minimum concentration capable of dissolving the part, so that the coating agent concentration might be 2.0%.

Preparation Example 24

(A methanol solution of a resol type coating agent)

200 g of the resol obtained in Preparation Example 21 was charged into a three-necked flask with a reflux condenser, 6.9 g (0.046 mol) of OSBP, 15.9 g (0.092 mol) of orthanilic acid, and 10.1 g (0.92 mol) of resorcin were added thereto, the mixture was heated to 75° C. over 20 min with stirring, and the reaction was continued with that temperature kept. When the viscosity reached 1,300 cps, which was measured by a Brookfield type viscometer, the temperature was lowered and an aqueous sodium hydroxide solution was added to terminate the reaction.

The coating agent concentration of the reaction product was 22%. It was diluted with water 2.0 times. Thereafter, 6N hydrochloric acid was added with stirring to adjust the pH to 2.0 thereby depositing a coating agent. The deposit was filtered under vacuum, washed with water of normal temperatures, dried, and ground to obtain a brown powdery substance. The Mw was 1980. Part of the brown powdery substance was dissolved in methanol to prepare a coating fluid having a coating agent concentration of 0.4%.

Preparation Example 25

(An aqueous alkali solution of a resol type coating agent)

Part of the brown powdery substance that was the product in Preparation Example 24 was dissolved in a 0.1% aqueous sodium hydroxide solution, whose concentration was the minimum concentration capable of dissolving the part, so that the coating agent concentration might be 2.0%, thereby preparing a coating fluid.

Example 16

Parts of a 7-1 stainless steel polymerization tank that included the wall surface, etc., and would be in contact with vinyl chloride monomer which would be charged afterward were sprayed with the coating fluid obtained in Preparation Example 22 using a spray so that the amount of the coating agent might be 0.1 g/m$^2$ and thereafter the methanol was distilled off under vacuum.

3,000 g of deionized water, 0.89 g of di-2-ethylhexylperoxy-di-carbonate, 0.28 g of cumyl peroxyneodecanoate, and 2.0 g of partially saponified polyvinyl alcohol having a degree of saponification of 80% were charged into the polymerization tank having the thus formed coating and the air in the polymerization tank was removed by a vacuum pump. Thereafter, 2,000 g of vinyl chloride was charged thereinto and the reaction was continued at 58° C. until the pressure reached 6.5 kg/cm$^2$-G.

After the completion of the reaction, unreacted monomer was recovered, and after the slurry was discharged, the polymerization tank inner wall and the like were rinsed with water. A second polymerization reaction which was the same as the first polymerization reaction was carried out, except that the coating fluid was not applied. Then, similarly the same polymerization was carried out 10 times successively.

Thereafter, the weight of the polymer adhered to the inner wall and the like was measured and was found to be 0.6 g/m$^2$. The slurry was dehydrated and dried and physical properties thereof were measured by the testing methods given below. The amount of the polymer adhered to the inner wall and the like was very small and the adhered small amount of the polymer could easily be washed away by simple washing with water. The results are shown in Table 7.

Example 17

Parts of a 7-1 stainless steel polymerization tank that included the wall surface, etc., and would be in contact with vinyl chloride monomer which would be charged afterward were sprayed with the coating fluid obtained in Preparation Example 23 using a spray so that the amount of the coating agent might be 0.5 g/m$^2$ and thereafter the coating was rinsed with water.

3,000 g of deionized water, 0.89 g of di-2-ethylhexylperoxy-di-carbonate, 0.28 g of cumyl peroxyneodecanoate, and 2.0 g of partially saponified polyvinyl alcohol having a degree of saponification of 80% were charged into the polymerization tank having the thus formed coating and the air in the polymerization tank was removed by a vacuum pump. Thereafter, 2,000 g of vinyl chloride was charged thereinto and the reaction was continued at 58° C. until the pressure reached 6.5 kg/cm$^2$-G.

After the completion of the reaction, unreacted monomer was recovered, and after the slurry was discharged, the polymerization tank inner wall and the like were rinsed with water. A second polymerization reaction which was the same as the first polymerization reaction was carried out, except that the coating fluid was not applied. Then, similarly the same polymerization was carried out 5 times successively. Thereafter, the weight of the polymer adhered to the inner wall and the like was measured and was found to be 1.0 g/m$^2$. The slurry was dehydrated and dried and physical properties thereof were measured by the testing methods given below.

The amount of the polymer adhered to the inner wall and the like was very small and the adhered small amount of the polymer could easily be washed away by simple washing with water. The reaction time was not prolonged and the physical properties of the obtained product were excellent. The results are shown in Table 7.

Comparative Example 8

Example 17 was repeated, except that the coating fluid was not applied and the polymerization was carried out only once. As shown in the results given Table 7, the adhered amount of the polymer was as very large as 45 g/m$^2$.

Example 18

Example 16 was repeated, except that, instead of the coating fluid used in Example 16 prepared in Preparation Example 22, the coating fluid prepared in Preparation Example 24 was used. As shown in the results given in Table 7, the adhered amount of the polymer was as notably small as 0.4 g/m² and the adhered polymer could easily be washed away by simple washing with water. The reaction time was not prolonged and the physical properties of the obtained were also excellent.

Example 19

Example 17 was repeated, except that, instead of the coating fluid used in Example 17 prepared in Preparation Example 23, the coating fluid prepared in Preparation Example 25 was used. As shown in the results given in Table 7, the adhered amount of the polymer was as notably small as 0.8 g/m² and the adhered polymer could easily be washed away by simple washing with water. The reaction time was not prolonged and the physical properties of the obtained were also excellent.

The present invention can be applied effectively under usual polymerization conditions to aqueous suspension polymerization and aqueous emulsion polymerization of the above monomer(s) as well as so-called mass polymerization of the above monomer(s) free from any polymerization medium.

Testing Methods

The testing methods and measuring methods used in the above Examples and Comparative Examples were as follows:

Average degree of polymerization: based on JIS K-6721.

Apparent specific gravity: based on JIS K-6721.

Fish eye: A PVC plasticizer, a heat stabilizer, etc., were incorporated in prescribed amounts and the mixture was kneaded at 150° C. for 5 min and was formed into a sheet. Thereafter, fish eyes present in an area of 10 cm×10 cm were measured in a usual manner.

Porosity: based on the mercury forced method.

TABLE 1

| Example | Example 1 | Comparative Example 1 | Comparative Example 2 |
|---|---|---|---|
| Number of times of polymerization | 4 | 1 | 4 |
| Coating fluid |  |  |  |
| pH at the time of the application | 7.0 | — | 7.0 |
| Coating amount (g/m²) | 0.5 | — | 0.5 |
| Wall surface temperature (°C.) at the time of the application | 70 | — | 25 |
| Reaction time (hr) | 5.1 | 5.0 | 5.1 |
| Adhered amount of the (g/m²) polymer | 0.4 | 45 | 15 |
| Average degree of polymerization | 1040 | 1050 | 1050 |
| Apparent specific gravity (g/ml) | 0.446 | 0.447 | 0.445 |
| Particle size distribution (wt %) |  |  |  |
| 60 mesh or over | 0 | 0 | 0 |
| 61–100 mesh | 38 | 37 | 37 |
| 101–200 mesh | 59 | 60 | 59 |
| 200 mesh or below | 3 | 3 | 4 |
| Number of fish eyes | 15 | 15 | 16 |
| Porosity (vol %) | 23.5 | 23.3 | 23.6 |

TABLE 2

| Example | Comparative Example 3 | Example 2 | Example 3 |
|---|---|---|---|
| Number of times of polymerization | 1 | 1 | 1 |
| Coating amount (g/m²) | — | 0.1 | 1.0 |
| Reaction time (hr) | 11.0 | 11.1 | 11.0 |
| Adhered amount of the polymer (g/m²) | 45 | 0.2 | 0.3 |
| Average degree of polymerization | 1050 | 1040 | 1050 |
| Apparent specific gravity (g/ml) | 0.520 | 0.521 | 0.522 |
| Particle size distribution |  |  |  |
| 60 mesh or over | 0 | 0 | 0 |
| 61–100 mesh | 37 | 38 | 38 |
| 101–200 mesh | 60 | 60 | 59 |
| 200 mesh or below | 3 | 2 | 3 |
| Number of fish eyes | 5 | 6 | 5 |
| Porosity (vol %) | 25.3 | 25.4 | 25.5 |

TABLE 3

| Example | Comparative Example 3 | Example 4 | Example 5 | Example 6 | Example 7 |
|---|---|---|---|---|---|
| Number of times of polymerization | 1 | 1 | 1 | 1 | 1 |
| Coating amount (g/m²) | — | 0.1 | 1.0 | 0.1 | 1.0 |
| Reaction time (hr) | 11.0 | 11.1 | 11.0 | 11.0 | 11.1 |
| Adhered amount of the polymer (g/m²) | 45 | 0.4 | 0.4 | 0.3 | 0.4 |
| Average degree of polymerization | 1050 | 1040 | 1060 | 1050 | 1040 |
| Apparent specific gravity (g/ml) | 0.520 | 0.522 | 0.521 | 0.523 | 0.522 |
| Particle size distribution |  |  |  |  |  |
| 60 mesh or over | 0 | 0 | 0 | 0 | 0 |
| 61–100 mesh | 37 | 38 | 38 | 37 | 36 |
| 101–200 mesh | 60 | 58 | 59 | 59 | 69 |
| 200 mesh or below | 3 | 4 | 3 | 4 | 4 |
| Number of fish eyes | 5 | 6 | 6 | 5 | 6 |
| Porosity (vol %) | 25.3 | 25.4 | 25.5 | 25.4 | 25.5 |

TABLE 4

|  | Example 8 | Example 9 | Example 10 | Example 11 | Comparative Example 4 | Comparative Example 5 | Comparative Example 6 |
|---|---|---|---|---|---|---|---|
| Number of times of polymerization | 1 | 2 | 2 | 4 | 1 | 1 | 1 |
| Coating fluid |  |  |  |  |  |  |  |
| Initial condensate | resol | resol | resol | resol | — | resol | Co-condensate of resorcin and benzaldehyde |
| Modifier |  |  |  |  |  |  |  |
| Hindered phenol | OSBP | OSBP | OSBP | OSBP | — | — | — |
| Nitrogen-containing compound | — | p-aminobenzoic acid | — | Orthanilic acid | — | — | — |
| polyvalent phenol | — | — | Pyrogallol | Resorcin | — | — | — |
| Coating amount (g/m$^2$) | 0.5 | 0.5 | 0.5 | 0.5 | — | 0.5 | 0.5 |
| Polymerization time (hr) | 5.0 | 5.1 | 5.1 | 5.1 | 5.0 | 5.0 | 5.0 |
| Physical properties of the resin |  |  |  |  |  |  |  |
| Adhered amount of the polymer (g/m$^2$) | 3.7 | 2.5 | 1.3 | 0.4 | 45.0 | 12.7 | 14.3 |
| Average degree of polymerization | 1060 | 1040 | 1050 | 1050 | 1050 | 1060 | 1050 |
| Apparent specific gravity (g/ml) | 0.433 | 0.446 | 0.447 | 0.445 | 0.447 | 0.446 | 0.444 |
| Particle size distribution |  |  |  |  |  |  |  |
| 60 mesh or over | 0 | 0 | 0 | 0 | 0 | 0 | 0 |
| 61–100 mesh | 36 | 38 | 40 | 38 | 37 | 38 | 37 |
| 101–200 mesh | 60 | 58 | 57 | 59 | 60 | 59 | 59 |
| 200 mesh or below | 4 | 4 | 3 | 3 | 3 | 3 | 4 |
| Number of fish eyes | 16 | 17 | 15 | 15 | 15 | 14 | 15 |
| Porosity (vol %) | 23.4 | 23.2 | 23.3 | 23.4 | 23.3 | 23.5 | 23.4 |

TABLE 5

| Experiment No. | Preparation Example 16 | Preparation Example 17 | Preparation Example 18 | Preparation Example 19 | Preparation Example 20 |
|---|---|---|---|---|---|
| Coating agent |  |  |  |  |  |
| First reaction |  |  |  |  |  |
| Phenol | Phenol | ← | ← | ← | ← |
| Aldehyde | Benzaldehyde | Acetaldehyde | ← | Formaldehyde | Acetaldehyde |
| Catalyst | Hindered phenol | ← | ← | ← | ← |
| Second reaction |  |  |  |  |  |
| Hindered phenol | OSBP | ← | ← | ← | ← |
| Polyvalent phenol | Pyrogallol | ← | Resorcin | Pyrogallol | ← |
| Catalyst | p-toluenesulfonic acid | ← | Hydrochloric acid |  | Orthanilic acid |
| Measured physical property |  |  |  |  |  |
| Reaction yield (%) | 70.5 | 60.7 | 63.5 | 71.8 | 44.9 |
| Mw | 2389 | 5197 | 4256 | 2035 | 1762 |
| pH at which deposition was made | 11.4 | 8.2 | 9.1 | 4.3 |  |
| Water-solubility (%) | 14.9 | 31.0 | 25.7 | 53.5 |  |

TABLE 6

| Experiment No. | Example 12 | Example 13 | Example 14 | Comparative Example 7 | Example 15 |
|---|---|---|---|---|---|
| Number of times of polymerization | 5 | 5 | 5 | 1 | 5 |
| Coating agent |  |  |  |  |  |
| First reaction |  |  |  |  |  |
| Phenol |  | Phenol | ← | ← | Phenol |

TABLE 6-continued

| Experiment No. | Example 12 | Example 13 | Example 14 | Comparative Example 7 | Example 15 |
|---|---|---|---|---|---|
| Aldehyde | Benzaldehyde | Acetaldehyde | ← | | Formaldehyde |
| Catalyst | Sodium hydroxide | ← | ← | | Sodium hydroxide |
| Second reaction | | | | | |
| Hindered phenol | OSBP | ← | ← | | OSBP |
| Polyvalent phenol | Pyrogallol | ← | Resorcin | | Pyrogallol |
| Catalyst | p-toluenesulfonic acid | ← | Hydrochloric acid | | |
| Coating agent concentration of the coating fluid (%) | 2.0 | ← | ← | | 2.0 |
| Time at which the coating agent was applied (g/m²) | 0.5 | ← | ← | | 0.5 |
| Polymerization time (hr) | 5.0 | 5.1 | 5.1 | 5.0 | 5.1 |
| Adhered amount of the polymer (g/m²) | 0.5 | 0.4 | 0.8 | 45.0 | 13.4 |
| Physical properties of the resin | | | | | |
| Average degree of polymerization | 1050 | 1040 | 1060 | 1050 | 1060 |
| Apparent specific gravity (g/ml) | 0.445 | 0.443 | 0.446 | 0.447 | 0.446 |
| Particle size distribution | | | | | |
| 60 mesh or over | 0 | 0 | 0 | 0 | 0 |
| 61–100 mesh | 38 | 36 | 38 | 37 | 40 |
| 101–200 mesh | 58 | 60 | 59 | 60 | 57 |
| 200 mesh or below | 4 | 4 | 3 | 3 | 3 |
| Number of fish eyes | 17 | 16 | 14 | 15 | 15 |
| Porosity (vol %) | 23.2 | 23.4 | 23.5 | 23.3 | 23.4 |

TABLE 7

| Experiment No. | Example 16 | Example 17 | Example 18 | Example 19 | Comparative Example 8 |
|---|---|---|---|---|---|
| Number of times of polymerization | 10 | 5 | 10 | 5 | 1 |
| Modified phenolic resin | | | | | |
| Initial condensate | Resol | Resol | Resol | Resol | — |
| Modifier | | | | | |
| Hindered phenol | OSBP | OSBP | OSBP | OSBP | — |
| Nitrogen-containing compound | P-aminobenzoic acid | P-aminobenzoic acid | Orthanilic acid | Orthanilic acid | — |
| Polyvalent phenol | Pyrogallol | Pyrogallol | Resorcin | Resorcin | — |
| Coating agent concentration (wt %) | 0.4 | 2.0 | 0.4 | 2.0 | — |
| Minimum concentration of sodium hydroxide | — | 0.1 wt % | — | 0.1 wt % | — |
| Type of the solvent used when the coating agent is dissolved therein to prepare a coating fluid | Methanol | 0.1 wt % aqueous sodium hydroxide solution | Methanol | 0.1 wt % aqueous sodium hydroxide solution | — |
| Coating amount (g/m²) | 0.1 | 0.5 | 0.1 | 0.5 | — |
| Polymerization time (hr) | 5.1 | 5.0 | 5.1 | 5.0 | 5.0 |
| Physical property of the resin | | | | | |
| Adhered amount of the polymer (g/m²) | 0.6 | 1.0 | 0.4 | 0.8 | 45.0 |
| Average degree of polymerization | 1040 | 1060 | 1060 | 1050 | 1050 |
| Apparent specific gravity | 0.444 | 0.445 | 0.440 | 0.443 | 0.447 |
| Particle size distribution (wt %) | | | | | |
| 60 mesh or over | 0 | 0 | 0 | 0 | 0 |
| 60–100 mesh | 38 | 40 | 37 | 38 | 37 |
| 100–200 mesh | 59 | 57 | 58 | 58 | 60 |
| less than 200 mesh | 3 | 3 | 5 | 4 | 3 |
| Number of fish eyes | 15 | 16 | 16 | 17 | 15 |
| Porosity (vol %) | 23.4 | 23.3 | 23.5 | 23.2 | 23.3 |

*) The concentration of the aqueous sodium hydroxide solution is four times the minimum concentration that dissolves the coating agent.

We claim:

1. A method of polymerizing vinyl chloride wherein when the vinyl chloride monomer is polymerized in an aqueous medium or is subjected to mass polymerization, a coating agent is previously applied to the surfaces of parts of a polymerizing apparatus that will come into contact with said monomer so that the produced vinyl chloride polymer is prevented from adhering to said surfaces, characterized in that a coating fluid containing a reaction product having a molecular weight of 1,000 to 50,000 obtained previously by the condensation reaction of a dihydroxybiphenyl and an aldehyde in the presence of an acid catalyst is applied to said surfaces, wherein said reaction product is one represented by the following formula:

wherein R represents a hydrogen atom, an alkyl group having 1 to 8 carbon atoms, a cycloalkyl group, an aryl group, or an aralkyl group, X represents a carboxyl group, an alkyl group, or a cycloalkyl group, m is an integer of 1 or 2, and n is an integer of from 2 to 500, said coating fluid being applied as a solution in which said reaction product is dissolved in a concentration of 0.1 to 10 wt. % in an aqueous solution of an alkali metal hydroxide and whose pH is adjusted to 8 to 3 with an inorganic acid or an organic acid.

2. A method as claimed in claim 1, wherein the dihydroxybiphenyl is selected from the group consisting of 2,2'-dihydroxybiphenyl, 2,2'-dihydroxy-5,5'-dimethylbiphenyl, 2,2'-dihydroxy-4,4',5,5'-tetramethylbiphenyl, 2,2'-dihydroxy-5,5'-dichlorobiphenyl, 2,2'-dihydroxy-5,5'-dicyclohexylbiphenyl, and 2,2'-dihydroxy-5,5'-di-tert-butylbiphenyl.

* * * * *